United States Patent [19]
Fritsch

[11] Patent Number: 5,567,047
[45] Date of Patent: Oct. 22, 1996

[54] TOOL COUPLING ASSEMBLY FOR A HANDHELD BLENDER

[75] Inventor: Thomas Fritsch, Eppstein, Germany

[73] Assignee: Braun Aktiengesellschaft, Kronberg, Germany

[21] Appl. No.: 490,467

[22] Filed: Jun. 14, 1995

[30] Foreign Application Priority Data

Jul. 12, 1994 [DE] Germany .................. 44 24 501.7

[51] Int. Cl.$^6$ ....................................... A47J 43/07
[52] U.S. Cl. ................. 366/129; 366/344; 403/325; 403/326
[58] Field of Search .................... 366/129, 130, 366/197, 199, 331, 344; 99/348; 403/325, 326, 327

[56] References Cited

U.S. PATENT DOCUMENTS

| | | |
|---|---|---|
| 2,639,904 | 5/1953 | McMaster et al. |
| 2,865,662 | 12/1958 | Nurmse ........................ 403/325 X |
| 3,299,924 | 1/1967 | Hanschitz .................... 366/129 X |
| 4,505,058 | 3/1985 | Peterson ...................... 403/326 X |
| 4,850,699 | 7/1989 | Rebordosa ................... 366/331 X |
| 5,048,996 | 9/1991 | DuBois et al. ............... 403/326 X |
| 5,368,384 | 11/1994 | Duncan et al. ............... 366/129 |

FOREIGN PATENT DOCUMENTS

| | | |
|---|---|---|
| 1467108 | 4/1967 | France . |
| 1170120 | 5/1964 | Germany .................. 366/129 |
| 16 54 001 | 2/1966 | Germany . |
| 19 52 912 | 5/1966 | Germany . |
| 28 02 155 | 7/1979 | Germany . |
| 420512 | 3/1967 | Switzerland . |
| 889462 | 2/1962 | United Kingdom .......... 403/326 |
| 1133685 | 11/1968 | United Kingdom . |

*Primary Examiner*—Charles E. Cooley
*Attorney, Agent, or Firm*—Fish & Richardson, P.C.

[57] ABSTRACT

A handheld blender, such as, for example, an immersion blender, includes a motor assembly and a tool assembly releasably connectable to the motor assembly. The tool assembly includes a tool shaft and a tool shank rotatably receiving the tool shaft. The motor assembly has a drive shaft and an approximately U-shaped expansion clamp. The tool shaft is structured to be non-rotatably coupled to the drive shaft when the tool assembly is connected to the motor assembly. The tool shank has a mounting groove, wherein the tool assembly is connected to the motor assembly by the approximately U-shaped expansion clamp engaging the mounting groove of the tool shank. To release the tool shank, the expansion clamp is displaced by a push button in the direction of an opposite push button having expansion surfaces on which the legs of the expansion clamp ride up, thus disengaging the expansion clamp from the mounting groove. To urge the tool shank away from the motor assembly, the push buttons have beveled surfaces.

11 Claims, 3 Drawing Sheets

TOOL COUPLING ASSEMBLY FOR A HANDHELD BLENDER

BACKGROUND OF THE INVENTION

This invention relates to a preferably electrically powered handheld blender in which the actual processing tool is interchangeably connected to a drive motor.

Handheld blenders are used as kitchen appliances such as handheld mixers or immersion blenders in which the actual processing tool as, for example, a whisk, a kneading tool or a comminuting rod, are inter-changeable.

German Utility Model No. 1,952,912 discloses a handheld mixing appliance which includes a motor means with which a tool shaft rotatably mounted in a tool shank is releasably connected. For fastening purposes, the tool shaft includes a circumferential groove engaged by an elastic detent means of the motor means. The transmission of torque is effected by a positive-engagement coupling arrangement.

It is a disadvantage in the known handheld mixing appliance that, rather than connecting the tool shank to the motor means, fastening is accomplished by the, detent means engaging the circumferential groove of the tool shaft, and by the mounting of the tool shaft in the tool shank. A clearance-free fastening of the tool shank to the motor means is thus difficult to accomplish. A further disadvantage is the relative motion of the rotating tool shaft and the detent means fixedly located in the motor means. This produces the undesired effect of friction and wear.

SUMMARY OF THE INVENTION

It is therefore an object of the present invention to improve upon a handheld blender of the type initially referred to such that a reliable and stable connection is ensured between the tool shank and the motor means, and that this connection is releasable by hand with ease and speed.

According to the present invention, this object is accomplished with a handheld blender that includes a motor assembly and a tool assembly releasably connectable to the motor assembly. The tool assembly includes a tool shaft and a tool shank rotatably receiving the tool shaft. The motor assembly has a drive shaft and an approximately U-shaped expansion clamp. The tool shaft is structured to be non-rotatably coupled to the drive shaft when the tool assembly is connected to the motor assembly. The tool shank has a mounting groove, wherein the tool assembly is connected to the motor assembly by the approximately U-shaped expansion clamp engaging the mounting groove of the tool shank. The mounting groove on the tool shank serving for engagement with the expansion clamp of the motor means may be of a circumferential configuration or alternatively, it may be composed of several mounting groove sections provided at those locations on the circumference of the tool shank that are engaged by the expansion clamp.

With the present invention, a stable and releasable connection between the motor means and the tool shank is accomplished in a simple manner. The connection is readily releasable, allowing quick tool changes.

Preferably, the expansion clamp engages the mounting groove at several locations distributed approximately evenly on the circumference. A fastening arrangement in which the clamp engages the mounting groove at two locations approximately diametrically opposed to one another is sufficient. The fastening of the tool shank in the motor means is thereby symmetrical in relation to a longitudinal axis of the tool shank, which axis coincides with the axis of rotation of the tool shaft. This prevents the occurrence of inadmissibly high loads on the mounting of the tool shank on the motor means, even if transverse forces act on the end of the tool shank facing away from the motor means, whereby moments of load occur imposing high loads on the fastening arrangement. A secure seating of the tool shank with the tool shaft mounted therein on the motor means is ensured.

To detach the tool shank from the motor means, two push buttons are provided by means of which the expansion clamp can be spread apart such as to unseat itself from the mounting groove. The push buttons are arranged on the motor means on opposed sides. One of the two push buttons bears against an apical area of the approximately U-shaped expansion clamp. The other push button includes an expansion wedge whose wedge surfaces are provided at the free ends of the legs of the expansion clamp. On compression of the two push buttons as a result of which they are moved towards each other, the one push button displaces the expansion clamp in the direction of the other push button. At the same time, the action of the other push button causes the expansion wedge to be introduced in the space between the two leg ends, the leg ends ride up the wedge surfaces, and the expansion clamp is spread apart such an amount that it becomes disengaged from the mounting groove of the tool shank. The tool shank can then be detached from the motor means. By reason of the use of two push buttons for releasing the tool shank, whereof one operates to displace the expansion clamp in the direction of the other push button, while at the same time the other push button, acting in opposition to this displacement, urges the expansion wedge into the space between the leg ends of the expansion clamp, the two push buttons are required to travel only a short distance for actuation.

In order to keep contaminants out of the interior of the motor means, the two push buttons are covered by a membrane. A housing of the motor means is hermetically sealed at the push buttons. Owing to its smooth outer surface, it can be cleaned easily. The membrane is exposed to only little deformation because of the short actuating travel of the push buttons, which is beneficial for its service life.

To secure the tool shank to the motor means, the end of the tool shank close to the motor means is provided with a frusto-conical surface. When the tool shank is introduced into the motor means, this frusto-conical surface spreads the expansion clamp apart, thus enabling the tool shank to be urged into a shank-mounting socket of the motor means until the expansion clamp snaps into the mounting groove of the tool shank, thus securing the tool shank to the motor means. The push buttons need not be actuated for insertion of the tool shank.

To provide a safeguard against relative rotation, the tool shank includes a polygon, a pin arranged eccentrically to the axis of the tool shaft or the like, which cooperates with the corresponding shank-mounting socket of the motor means.

To detach the tool shank from the motor means, the push buttons are provided with beveled surfaces. These abuttingly engage the end of the tool shank close to the motor means when the push buttons are compressed such an extent that the expansion clamp is spread out of its engagement with the mounting groove. In particular, the beveled surfaces bear against the frusto-conical surface serving to spread the expansion clamp apart as the tool shank is inserted. On further compression of the push buttons, the beveled surfaces urge the tool shank away from the motor means. The wedge surfaces do not take effect until after the expansion clamp is spread apart, that is, after the tool shank is released from its mounting on the motor means. This aids in detaching the tool shank from the motor means. The tool shank which may have become soiled in use need not be grasped for removal, being detachable from the motor means using one hand holding the motor means while its thumb and index finger compress the push buttons.

In a preferred embodiment of the present invention, the push buttons and, where applicable, the membrane covering the push buttons, do not project from the outer surface of the motor means at all or only a small amount in order to avoid inadvertent disengagement of the tool shank, which could happen easily in cases where the actuating elements for releasing the tool shank project outwardly.

A parting line between the housing of the motor means and the tool shank is sealed with a seal to prevent the ingress of contaminants. Ease of tool cleaning is afforded by a substantially smooth transition from the tool shank to the motor means.

BRIEF DESCRIPTION OF THE DRAWING

An embodiment of the present invention will be described in more detail in the following with reference to the accompanying drawings. In the drawings.

DETAILED DESCRIPTION OF THE INVENTION

Figure 1A:
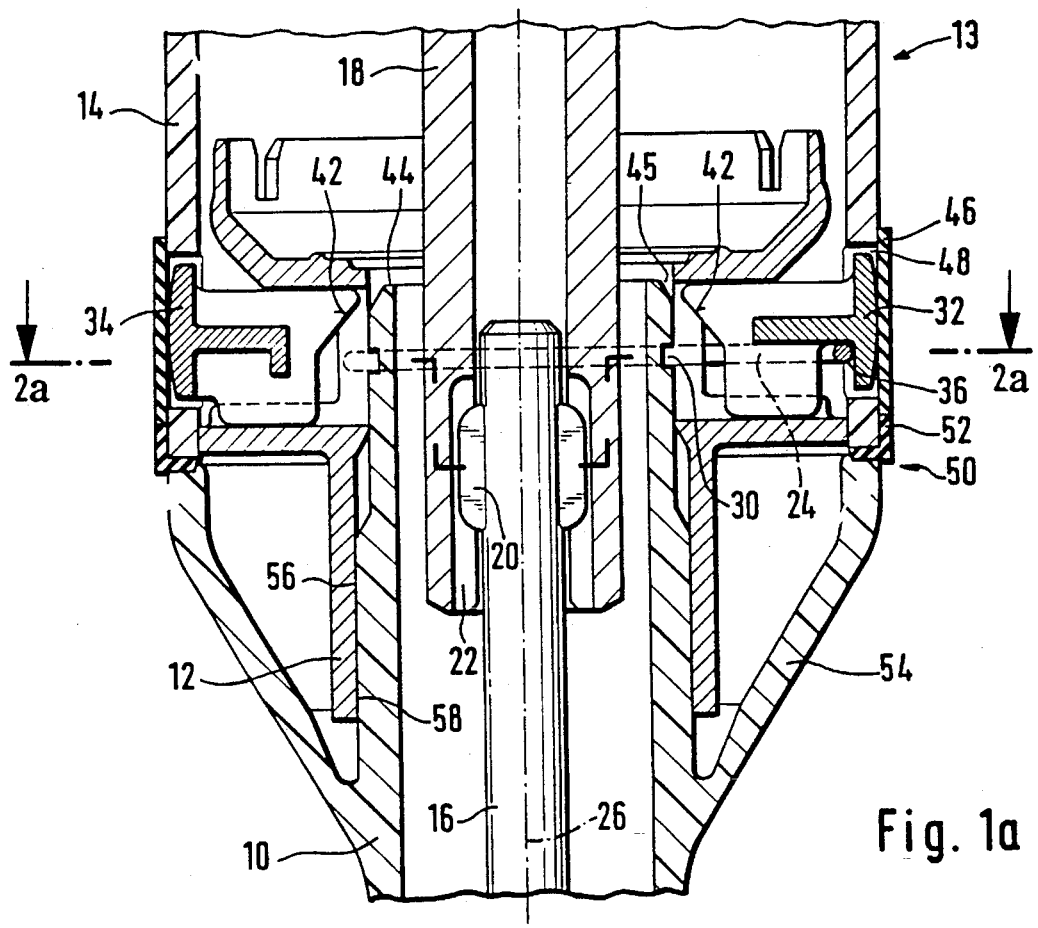
FIGS. 1a to 1c are axial sections through the tool connecting area illustrating an embodiment of the tool of the present invention.

The Figures show a connecting area of an immersion blender as an example of a tool of the present invention powered by an electric motor, and while the tool itself is not shown in the drawings, it is rotary within a downwardly open bell structure providing a tool guard, comminuting food materials as it rotates.

Figure 2A:
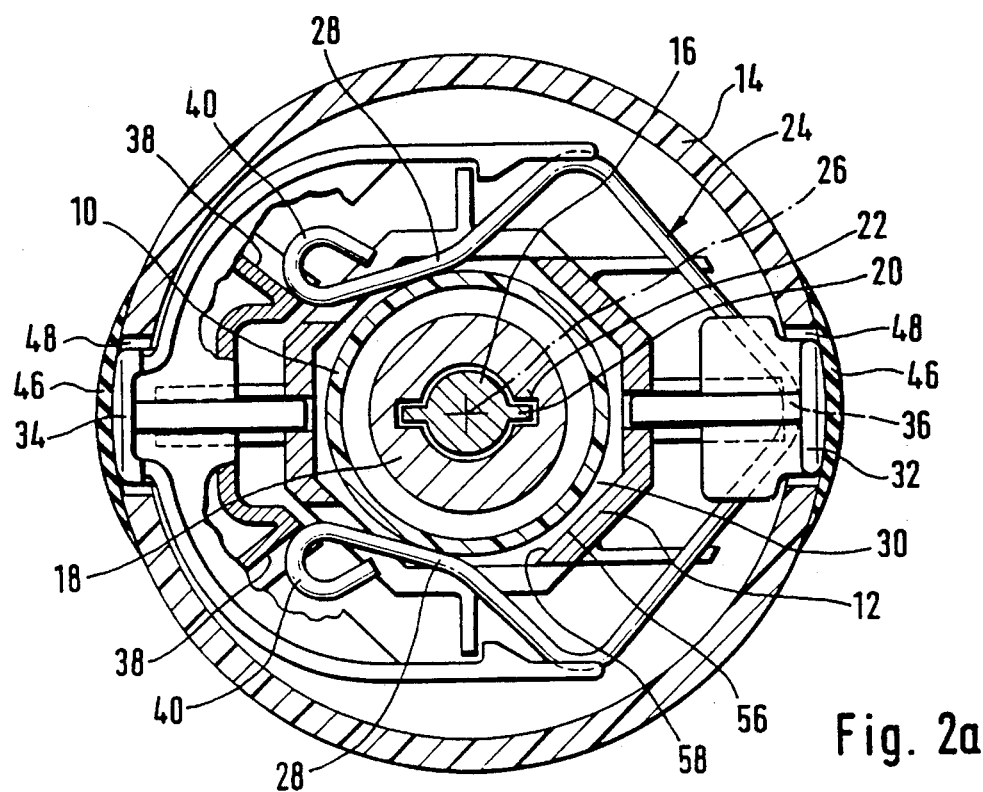
FIG. 2a is a cross section view through line 2a—2a of FIG. 1a, FIG. 2b is a cross section view through line 2b—2b of FIG. 1b.

In FIGS. 1a and 2a, an elongate hollow cylindrical tool shank 10 is inserted into a shank-mounting socket 12 of a motor means 13 whose housing is identified by reference numeral 14. Rotatably mounted in the tool shank 10 is a tool shaft 16 having attached to its end facing away from the motor means 13 a tool not shown. The end of the tool shaft 16 close to the motor means is received within a drive shaft 18, configured as a hollow shaft, of the motor means 13.

The transmission of a rotary motion of the drive shaft 18 to the tool shaft 16 is accomplished by a positive-engagement coupling means: Two radially projecting wings 20 extending in the longitudinal direction are squeezed out of the tool shaft 16 at the end received in the drive shaft 18. These wings 20 are in engagement with two longitudinally extending grooves 22 on the inside of the hollow drive shaft 18.

To releasably attach the tool shank 10 to the motor means 13, an approximately U-shaped expansion clamp 24 is arranged in a plane normal to a longitudinal axis 26 of the tool shank 10 in the housing 14 of the motor means 13 (the longitudinal axis 26 being at the same time the axis of rotation of the tool shaft 16 and the drive shaft 18). The expansion clamp 24 has its two legs 28 in engagement with a mounting groove 30 at two approximately opposite locations, the mounting groove being provided circumferentially in the outer surface at the end of the tool shank 10 received in the shank-mounting socket 12. The expansion clamp 24 holds the tool shank 10 against the housing 14 in its longitudinal direction, thus preventing it from being pulled out of its socket 12.

Figure 2B:
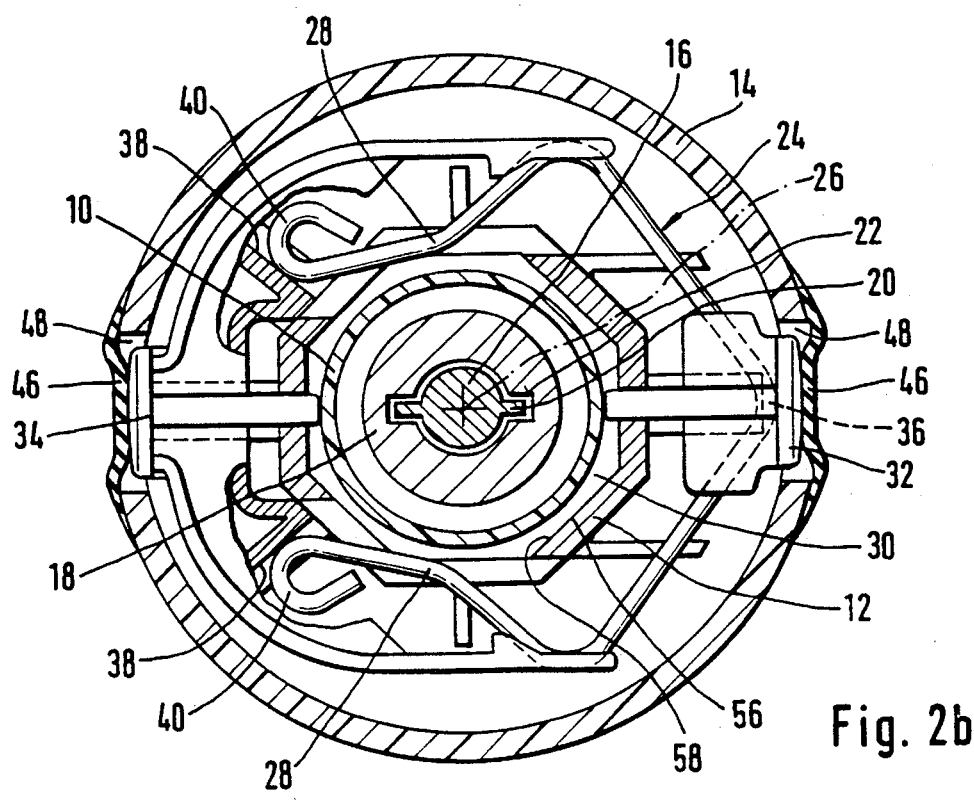
FIG. 2c is a cross section view through line 2c—2c of FIG. 1c.
Figure 2C:
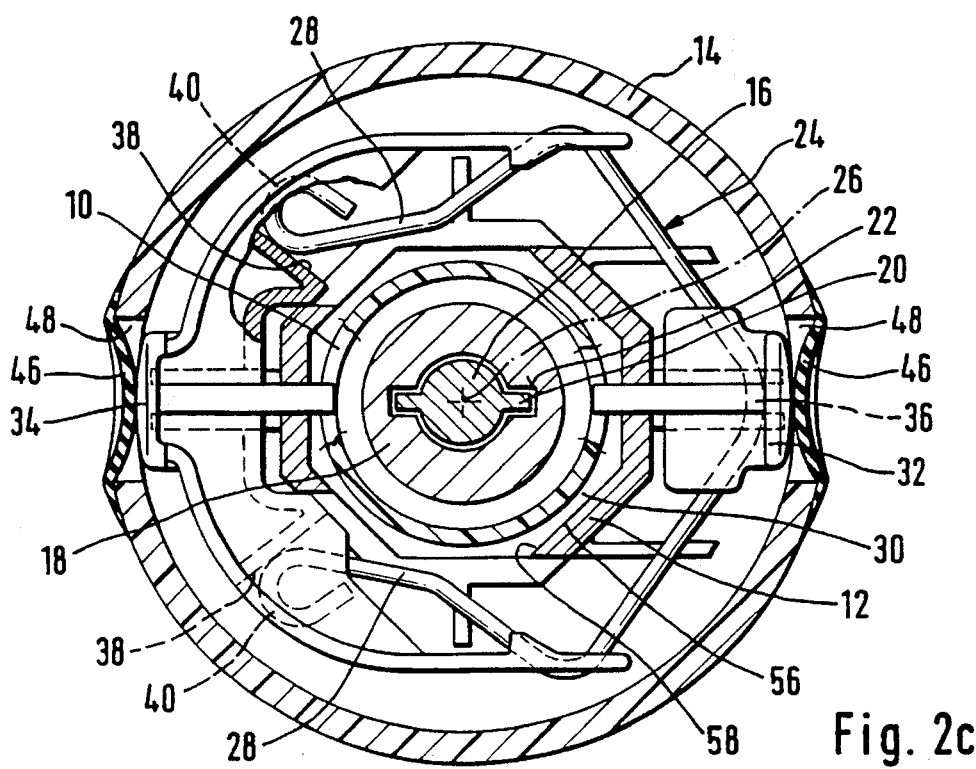

To release the tool shank 10, two push buttons 32, 34 are provided (for clarity of illustration, these are shown in FIGS. 2a to 2c in plan view). These push buttons 32, 34 are arranged in the housing 14 opposite each other at a radial distance to the axis of rotation 26. They can be urged into the interior of the housing 14 in a radial direction. The right-hand push button 32 when viewing the Figures bears against an apex 36 of the expansion clamp 24. By pushing the push button 32 into the interior of the housing 14, the expansion clamp 24 is displaced in its plane in the direction of the opposite push button 34. This opposite push button 34 shown on the left-hand side when viewing the Figures includes an expansion wedge having expansion surfaces 38 against which the clamp legs 28 abut with their free ends 40. By varying the expansion wedge angle of the expansion surface 38, it is possible to adapt the unlocking travel of the detent means to the actuating travel of the push buttons 32, 34 rather arbitrarily.

Figure 1B:
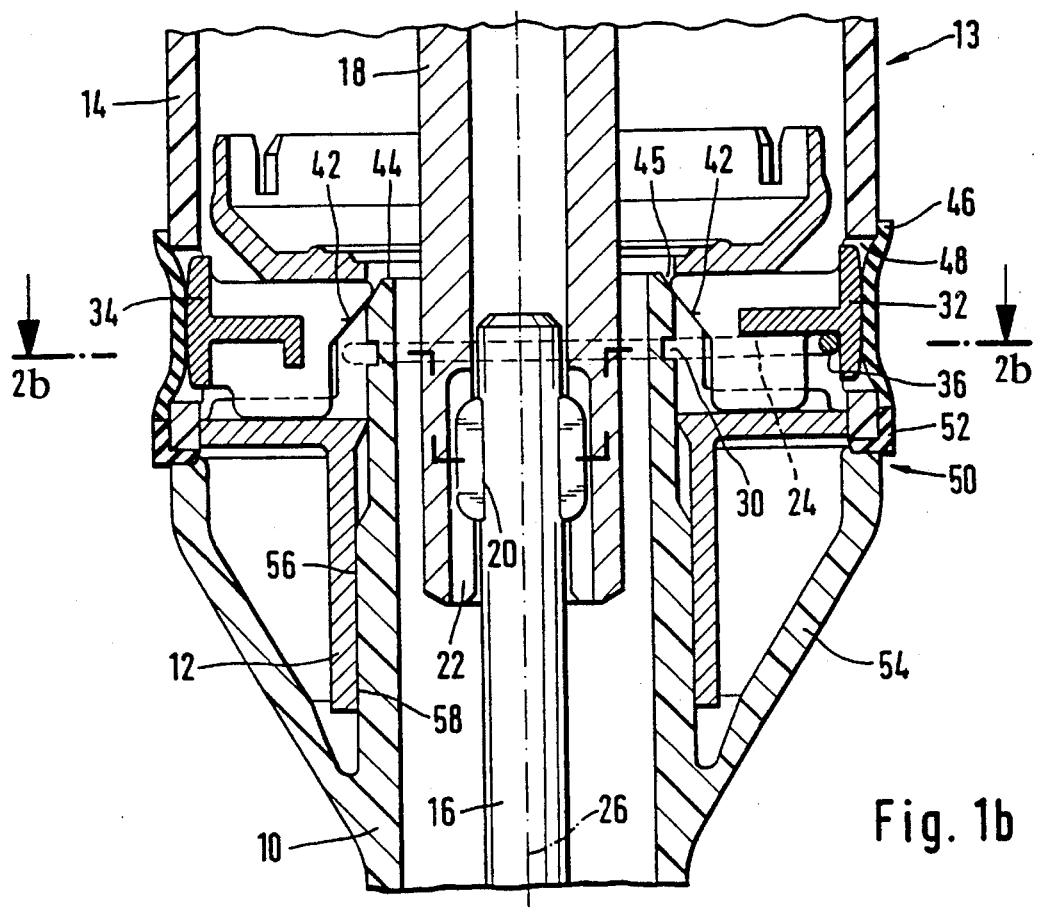

On displacement of the expansion clamp 24 by means of the one push button 32, the free ends 40 of the clamp legs 28 ride up the expansion surfaces 38, causing a small amount of spreading of the expansion clamp 24. In addition, as the other push button 34 is pressed, its expansion wedge is urged into the space between the clamp legs 28, as a result of which the clamp legs 28 are equally spread apart by the expansion surfaces 38. The clamp legs 28 become disengaged from the mounting groove 30, the connection between the tool shank 10 and the motor means 13 is released, and the tool shank 10 can be removed (FIGS. 1b and 2b).

Figure 1C:
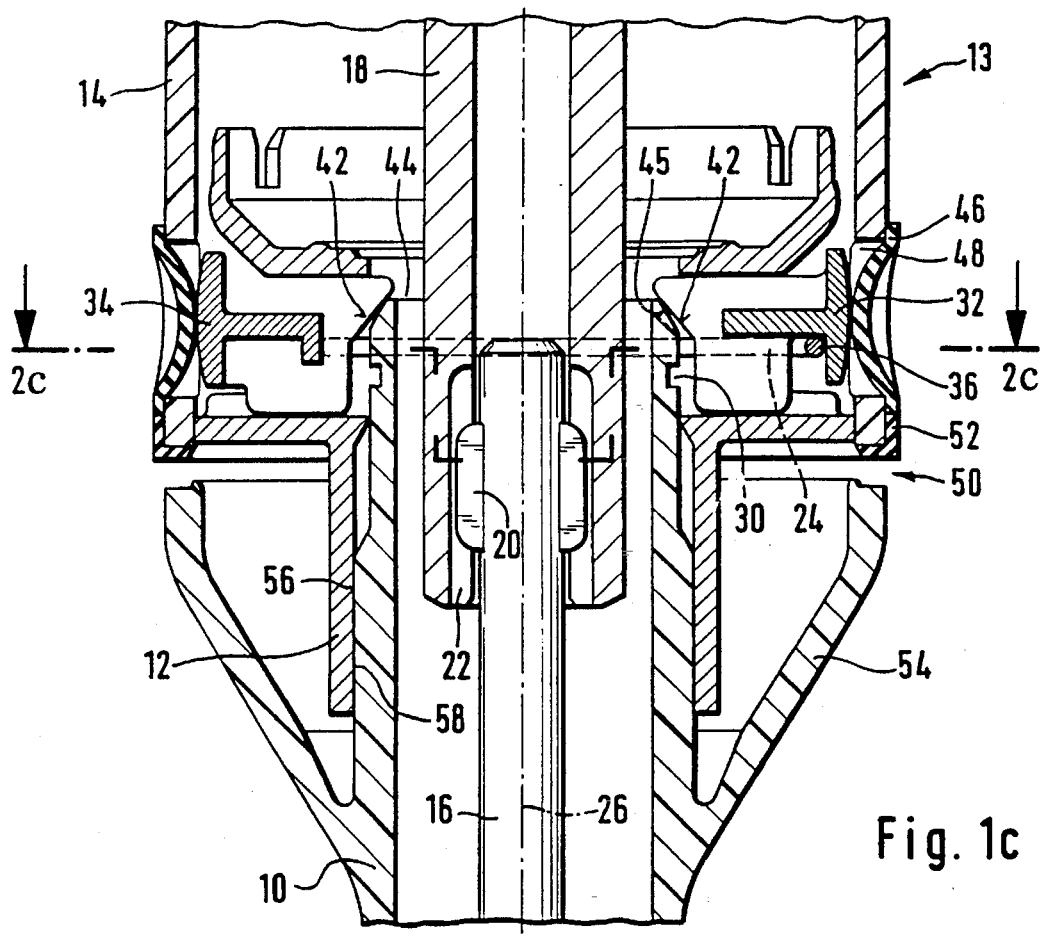

To aid in the removal of the tool shank 10, the push buttons 32, 34 are provided with beveled surfaces 42. These beveled surfaces 42 abuttingly engage a peripheral rim 44 at the end of the tool shank 10 close to the motor means 13 when the two push buttons 32, 34 are compressed such an amount that the expansion clamp 24 is disengaged from the mounting groove 30 (FIGS. 1b and 2b). On further compression of the two push buttons 32, 34, the beveled surfaces 42 urge the tool shank 10 at its peripheral rim 44 away from the motor means 13 (FIGS. 1c and 2c), ejecting the tool shank 10 from its socket 12. Release and ejection of the tool shank 10 can thus be accomplished with one hand holding the housing 14 of the motor means 13 and using its thumb and index finger to compress the two push buttons 32, 34. The need to touch the tool shank 10 is eliminated.

The two push buttons 32, 34 have their respective outsides flush with the housing 14. The absence of a protrusion thus avoids an inadvertent release of the tool shank 10. The push buttons are covered by means of a respective membrane 46 injection-molded onto the, housing 14. The membranes 46 close push button openings 48 in the housing 14, thus affording a seal against the entrance of contaminants. By virtue of their cooperative relationship, the push buttons 32, 34 have a short actuating travel for release and ejection of the tool shank 10. This results in a small amount of deformation of the membranes 46 as the push buttons 32, 34 are compressed, thus extending their service life.

To prevent the entrance of contaminants at a parting line 50 between the housing 14 of the motor means 13 and the tool shank 10, a seal 52 is arranged between the housing 14 and the tool shank 10. This seal 52 is injection-molded onto the housing 14. The seal 52 provides sealing relative to a bell structure 54 which is formed integrally with the tool shank 10, encompasses the end of the tool shank 10 inserted into the shank-mounting socket 12, and widens in the direction of the housing 14, thus terminating flush with the housing 14. This results in a smooth and consequently easy-to-clean outer surface of the housing 14 with the tool shank 10 attached thereto.

To insert the tool shank 10 into the shank-mounting socket 12 of the motor means 13, the peripheral rim 44 is provided with a frusto-conical surface 45 at the end of the tool shank 10 close to the motor means. This frusto-conical surface 45 causes the expansion clamp 24 to be spread apart when the tool shank 10 is urged into its socket 12, and the tool shank 10 can be pushed into its socket 12 until the expansion clamp 24 snaps into the mounting groove 30 of the tool shank 10 without the need to actuate the push buttons 32, 34. With the expansion clamp 24 snapping into the mounting groove 30, the tool shank 10 is connected with the motor means 13. As the tool shank 10 is being inserted into its socket 12, the wings 20 on the tool shaft 16 engage the grooves 22 in the drive shaft 18, so that the tool shaft 16 and the drive shaft 18 are rotationally fixed relative to each other.

In order to lock the tool shank 10 against rotation relative to the motor means 13, the tool shank 10 has at its end received in the socket 12 an external octagon 56 held in positive engagement with an internal octagon 58 of the shank-mounting socket 12.

What is claimed is:

1. A handheld blender comprising a motor assembly and a tool assembly releasably connectable to said motor assembly, said tool assembly including a tool shaft and a tool shank rotatably receiving said tool shaft, said motor assembly having a drive shaft and an approximately U-shaped expansion clamp, said tool shaft being non-rotatably coupled to the drive shaft when said tool assembly is connected to said motor assembly, said tool shank having a mounting groove, wherein connection of the tool assembly with the motor assembly is accomplished by the approximately U-shaped expansion clamp engaging the mounting groove.

2. A handheld blender as claimed in claim 1, wherein the expansion clamp engages the mounting groove at locations distributed approximately evenly about a circumference of the tool shank.

3. A handheld blender as claimed in claim 1, wherein the expansion clamp engages the mounting groove at two locations approximately diametrically opposed to one another.

4. A handheld blender as claimed in any one of the claims 1 to 3, wherein said motor assembly includes two push buttons arranged on opposed sides of said motor assembly and wherein the expansion clamp is adapted to be spread apart by means of the two push buttons, the one push button bearing against an apical area of the expansion clamp, while the other push button includes an expansion wedge spreading the expansion clamp apart when the two push buttons are compressed.

5. A handheld blender as claimed in claim 4, wherein the two push buttons are each covered[ by a membrane.

6. A handheld blender as claimed in claim 1, wherein an end of the tool shank close to the motor assembly is provided with a frusto-conical surface.

7. A handheld blender as claimed in claim 1, wherein the tool shank and the motor assembly are structured and arranged with a positive-engagement safeguard against relative rotation.

8. A handheld blender as claimed in claim 4, wherein the push buttons are provided with beveled surfaces urging the tool shank away from the motor assembly when the push buttons are compressed.

9. A handheld blender as claimed in claim 4, wherein said motor assembly includes a housing and wherein the push buttons project outwardly from the housing of the motor assembly by no more than a small amount.

10. A handheld blender as claimed in claim 4, wherein said motor assembly includes a housing and a seal disposed between the housing of the motor assembly and the tool shank.

11. A handheld blender, comprising:
 a motor assembly, including a drive shaft, an approximately U-shaped expansion clamp, and an expansion wedge; and
 a tool assembly being releasably connectable with the motor assembly, including a tool shaft being non-rotatably coupled to the drive shaft with the tool assembly connected with the motor assembly, and a tool shank receiving rotatably therein said tool shaft, said tool shank having an exterior surface forming a mounting groove engaged by the expansion clamp with the tool assembly connected with the motor assembly, wherein movement of at least one of the expansion wedge and the expansion clamp relative to the other spreads the expansion clamp, disengaging the mounting groove and releasing the tool assembly from the motor assembly.

* * * * *